United States Patent
Talon et al.

(10) Patent No.: US 9,820,606 B2
(45) Date of Patent: Nov. 21, 2017

(54) FOOD PREPARATION MACHINE WITH SAFETY FEATURE

(71) Applicant: NESTEC S.A., Vevey (CH)

(72) Inventors: Christian Talon, Vufflens-le-Chateau (CH); Michael Ayoub, Crissier (CH)

(73) Assignee: Nestec S.A., Vevey (CH)

(*) Notice: Subject to any disclaimer, the term of this patent is extended or adjusted under 35 U.S.C. 154(b) by 129 days.

(21) Appl. No.: 14/423,892

(22) PCT Filed: Sep. 2, 2013

(86) PCT No.: PCT/EP2013/068072
§ 371 (c)(1),
(2) Date: Feb. 25, 2015

(87) PCT Pub. No.: WO2014/037299
PCT Pub. Date: Mar. 13, 2014

(65) Prior Publication Data
US 2015/0216350 A1  Aug. 6, 2015

(30) Foreign Application Priority Data
Sep. 5, 2012 (EP) .................................. 12183056

(51) Int. Cl.
*A47J 31/06* (2006.01)
*A47J 31/40* (2006.01)
(Continued)

(52) U.S. Cl.
CPC ......... *A47J 31/407* (2013.01); *A47J 31/0673* (2013.01); *A47J 31/3628* (2013.01); *A47J 31/46* (2013.01)

(58) Field of Classification Search
CPC ...... A47J 31/0673; A47J 31/46; A47J 31/407; A47J 31/3628
(Continued)

(56) References Cited

U.S. PATENT DOCUMENTS

| | | | | |
|---|---|---|---|---|
| 2010/0180774 A1* | 7/2010 | Kollep | ............... | B65D 85/8043 99/295 |
| 2010/0239734 A1* | 9/2010 | Yoakim | ................... | A47J 31/22 426/433 |

FOREIGN PATENT DOCUMENTS

| | | |
|---|---|---|
| CN | 1618382 | 5/2005 |
| DE | 102009052513 | 5/2011 |

(Continued)

OTHER PUBLICATIONS

Chinese Office Action for Application No. 201380046270 dated Sep. 5, 2016.
(Continued)

*Primary Examiner* — Phuong Nguyen
(74) *Attorney, Agent, or Firm* — K&L Gates LLP

(57) ABSTRACT

A beverage preparation machine includes a capsule holder for holding a capsule, a fluid conduction system, a brewing head having an aperture for receiving the capsule holder, and an injection support connected to the fluid conduction system, an injection plate supported by the support, including an upper surface connected to the fluid conduction system through the support. The injection plate includes at least one channel independent from the fluid conducting channel connecting its upper and lower surfaces, the channel being suitable for circulating fluid at least from the lower surface towards the upper surface of the injection plate, the channel further including at least one piercing element having a base attached to the injection plate and an apex directed towards the lower surface of the injection plate.

18 Claims, 4 Drawing Sheets

(51) Int. Cl.
 *A47J 31/36* (2006.01)
 *A47J 31/46* (2006.01)
(58) Field of Classification Search
 USPC .......... 99/295, 282, 283, 302 R, 302 C, 323, 99/280, 281, 300; 426/77, 79, 80, 87, 426/231, 425, 431, 433
 See application file for complete search history.

(56) References Cited

FOREIGN PATENT DOCUMENTS

| | | |
|---|---|---|
| EP | 1529469 | 5/2005 |
| EP | 2481330 | 8/2012 |
| WO | 2009013777 | 1/2009 |
| WO | 2012011053 | 1/2012 |
| WO | 2012104760 | 8/2012 |

OTHER PUBLICATIONS

English Translation of Chinese Office Action for Application No. 201380046270 dated Sep. 5, 2016.

\* cited by examiner

FOOD PREPARATION MACHINE WITH SAFETY FEATURE

CROSS REFERENCE TO RELATED APPLICATIONS

The present application is a National Stage of International Application No. PCT/EP2013/068072, filed on Sep. 2, 2013, which claims priority to European Patent Application No. 12183056.6, filed on Sep. 5, 2012, the entire contents of which are being incorporated herein by reference.

FIELD OF THE INVENTION

The present invention concerns a machine for food and/or beverage preparation suitable for us with closed ingredient capsules, that comprises a built-in feature for avoiding blockage of the capsules.

BACKGROUND OF THE INVENTION

Beverage preparation machines are well known in the food industry and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine is a beverage preparation machine working with a rigid or semi-rigid capsule.

The machine preferably comprises a receptacle for accommodating said capsule and a fluid injection system for injecting a fluid, preferably water, under pressure into said capsule. Water injected under pressure in the capsule, for the preparation of a coffee beverage, is preferably hot, that is to say at a temperature above 70° C. However, in some particular instances, it might also be at ambient temperature, or even at a chilled temperature. The pressure inside the capsule chamber during extraction and/or dissolution of the capsule contents is typically about 1 to about 8 bar for dissolution products and about 2 to about 12 bar for extraction of roast and ground coffee. The present invention could also encompass the so-called "brewing" process of beverage preparation—particularly for tea and coffee. Brewing involves a time of infusion of the ingredient by a fluid (e.g. hot water), whereas the extraction or dissolution preparation process allows a consumer to prepare a beverage, for instance coffee, within a few seconds.

Generally, in the following specification, the term "brewing" of an ingredient by a fluid, is meant to encompass extraction of a powdered edible material such as for instance roast and ground powdered coffee, or dissolution of edible soluble material such as for instance soluble tea or coffee, milk, cocoa mixes, or infusion of an edible material with an infusion fluid under very low relative pressure, or atmospheric pressure, for a longer time than that required for extraction or dissolution, for instance infusion of tea leaves by hot water.

The principle of extracting and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent n° EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating unit such as a boiler or a heat exchanger, which is able to warm up the water used therein to working temperatures (classically temperatures up to 80-90° C.). Finally, the machine comprises a pump element for circulating the water from the tank to the capsule, optionally though the heating unit. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules typically comprise:
  a hollow body and an injection wall which is impermeable to liquids and to air and which is attached to the body and adapted to be punctured by e.g. an injection needle of the machine,
  a chamber containing a bed of roast and ground coffee to be extracted or a soluble beverage precursor ingredient, e.g. a milk based powder or soluble powdered tea,
  an aluminium membrane disposed at the bottom end of the capsule, that hermetically closes the capsule, for retaining the internal pressure in the chamber, this bottom membrane being associated with piercing means for piercing dispensing holes in the aluminium membrane when the internal pressure inside the chamber reaches a certain pre-determined value,
  optionally, means configured to break the jet of fluid so as to reduce the speed of the jet of fluid injected into the capsule and distribute the fluid across the bed of substance at a reduced speed. It is often important for the user to know when the water level in the machine tank is too low to prepare a full beverage.

In many instances, the capsules for use in beverage preparation machines are closed capsules as described above. Such closed capsules are interesting because they protect the ingredient contained therein from ambient gas and moisture and allow long conservation time. Typically, such closed capsules are made from gas and/or moisture impermeable material and feature a rigid or semi-rigid body having a one of its walls—for instance the top wall—made from a membrane which is to be pierced by the fluid injection needle of the beverage preparation machine. When liquid is injected in the capsule compartment, a pressure is built up, which serves as an extraction means for extracting ingredients contained inside the capsule through a dispensing wall of the capsule—typically the bottom wall—.

However, beyond their clear benefits for the consumer as described above, closed capsules may also raise certain issues.

It was found that in some—generally exceptional—cases, when the machine starts injecting fluid (e.g. water) under pressure within the capsule, the opening of the membrane located at the dispensing side of the capsule does not occur when fluid pressure inside the capsule builds-up.

As a first result, the beverage is not dispensed to the consumer, who has to withdraw the blocked capsule from the machine, and replace it with a new one. This withdrawal operation may however be messy, because the fluid inside the capsule is under pressure, and when the consumer opens the machine, the injection needle is removed from the top wall (e.g. top membrane) of the capsule, and fluid under pressure flows, or sometimes even sprays, out of the capsule, which is of course undesirable.

More than that, in some instances, the beverage preparation machine comprises a security, which prevents opening of its capsule compartment until in-capsule pressure has not decreased to a predetermined value. In case of capsule blockage, the machine cannot be re-opened, unless the capsule is pierced using a piercing tool, for instance by accessing the dispensing pierceable membrane from below said capsule, which is also undesirable and not user-friendly.

Although such cases of blocked capsules are exceptional, it is highly desirable to provide a food and/or beverage preparation machine which prevents capsule blockage. This is the primary objective of the present invention.

In European application EP 1529469 A1, is described a beverage preparation machine which comprises a plate with one injection needle to inject a fluid under pressure within a capsule functionally inserted within the machine, in contact with said plate. The plate further comprises a set of hollow extraction needles that largely protrude outside the plate surface, at a distance from the surface of the plate such that when the capsule is normally functionally inserted within the machine the extraction needles also pierce through the wall of the capsule and allow to withdraw a beverage product therefrom, and conduct it to a beverage delivery outlet of the machine. This document does not provide a safety solution to blocked capsules, where the normal delivery opening of the capsule does not function.

SUMMARY OF THE INVENTION

The main objective set out above is met with a beverage preparation machine for preparing a beverage from a food substance contained in a capsule by injection of a fluid into said capsule, said machine comprising:
  a capsule holder for holding a capsule, said holder having a cup-shaped body, a handle portion, and a dispensing opening through the bottom portion of said body,
  a fluid conduction system comprising a fluid reservoir, a fluid pump, optionally a fluid heater, said reservoir, pump and heater being connected by fluid pipes,
  a brewing head having an aperture for receiving said capsule holder, and an injection support connected to the fluid conduction system,
  an injection plate supported by said support, said injection plate comprising an upper surface connected to the fluid conduction system through said support, said injection plate further comprising a fluid injection element located in the lower surface of said injection plate, such that said injection element is able to inject fluid into the capsule by piercing through a flexible injection wall of the capsule.

The injection plate further comprises at least one channel independent from the fluid conducting channel connecting its upper and lower surfaces, said channel being suitable for circulating fluid at least from the lower surface towards the upper surface of said injection plate, said channel further comprising at least one piercing element having a base attached to said injection plate and an apex directed towards the lower surface of said injection plate.

Therefore, the present invention consists in integrating holes combined with a piercing element in the needle plate. Due to the fact that the top membrane of the capsule is not supported in the region of the holes, it will deform when fluid pressure increases within the capsule (during injection for beverage preparation) and flex upwardly towards the piercing element that will pierce said top membrane and therefore release the pressure.

In an essential and characterizing aspect of the invention, the apex of the piercing element is located inside the channel of the needle plate, or it protrudes outside of said channel, at a distance from the surface of the injection plate comprised between 1 µm and 2 mm, preferably comprised between 100 µm and 1 mm, more preferably comprised between 200 µm and 500 µm.

As it is clear, the function of the piercing elements is not to pierce the capsule in normal use conditions. In normal use conditions, the upper p injection wall of the capsule is pierced by the injection needle of the machine, which injects fluid (e.g. water) under pressure therein, where said fluid mixes with a precursor ingredient contained in the capsule to form a food product, for instance a beverage. As fluid is injected inside the capsule, pressure builds-up until it reaches a predetermined value where a delivery wall of the capsule opens to release the food product. The delivery wall of the capsule is different from the injection wall of said capsule. The piercing elements according to the invention function as a fuse system: in case the delivery wall of the capsule does not open under effect of the fluid pressure build-up, the upper flexible membrane of the capsule will flex up and press onto the injection plate of the machine, where it will contact the piercing elements. As pressure continues to build-up, the injection wall of the capsule presses more and more onto the piercing elements, up to point where it will be pierced by the piercing elements. In that case, the fluid pressure inside the capsule is released, which avoids a blocked capsule inside the machine. In other words, the piercing elements are designed and dimensioned relative to the other functional elements of the machine such that—i.e. the distance of their piercing apex relative to the surface of the injection plate is such that—they are able to pierce the capsule only in exceptional cases, if the capsule does not open normally. In that sense, they function as a safety feature only.

Advantageously, said apex is conical.

Furthermore, the piercing element can be hollow (like a needle), or it can be plain.

In a preferred embodiment of the invention, the piercing element comprises a base attached to the internal surface of the channel, said base having a cross section inferior to the corresponding cross section of said channel along at least one radial direction.

The injection plate can be made of a metallic or alloy solid material, coated with an elastic material on its lower surface; and the piercing element is preferably made of a rigid metallic material.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
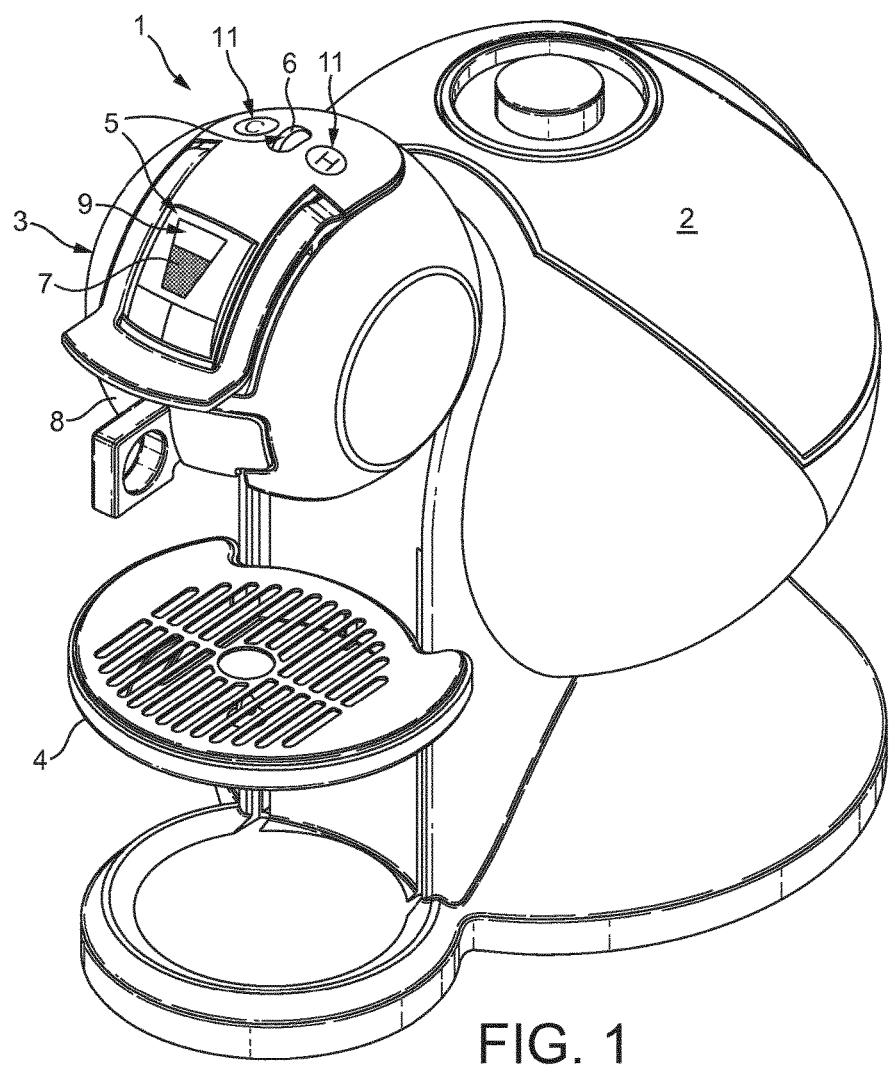
FIG. 1 is a schematic perspective view of a beverage preparation machine according to the invention.

The present invention concerns a machine 1 of the type illustrated in FIG. 1. Such a machine 1 comprises a water reservoir 2, a brewing head 3, a cup tray 4 that can be set at different heights relative to the brewing head, control panel and buttons 5. In a possible embodiment, the control buttons comprise more particularly a rotating wheel 6 and the control panel is a screen 7. An ingredient capsule can be placed in a capsule holder 8 which is removably inserted into the brewing head 3. The screen 7 is suitable for displaying various information to the consumer, for instance the volume level 9 that is dispensed in the cup. The user can also choose the temperature of the beverage that will be prepared, by actuating hot or cold buttons 11 which are present close to the wheel and screen on the surface of the brewing head.

Figure 2:
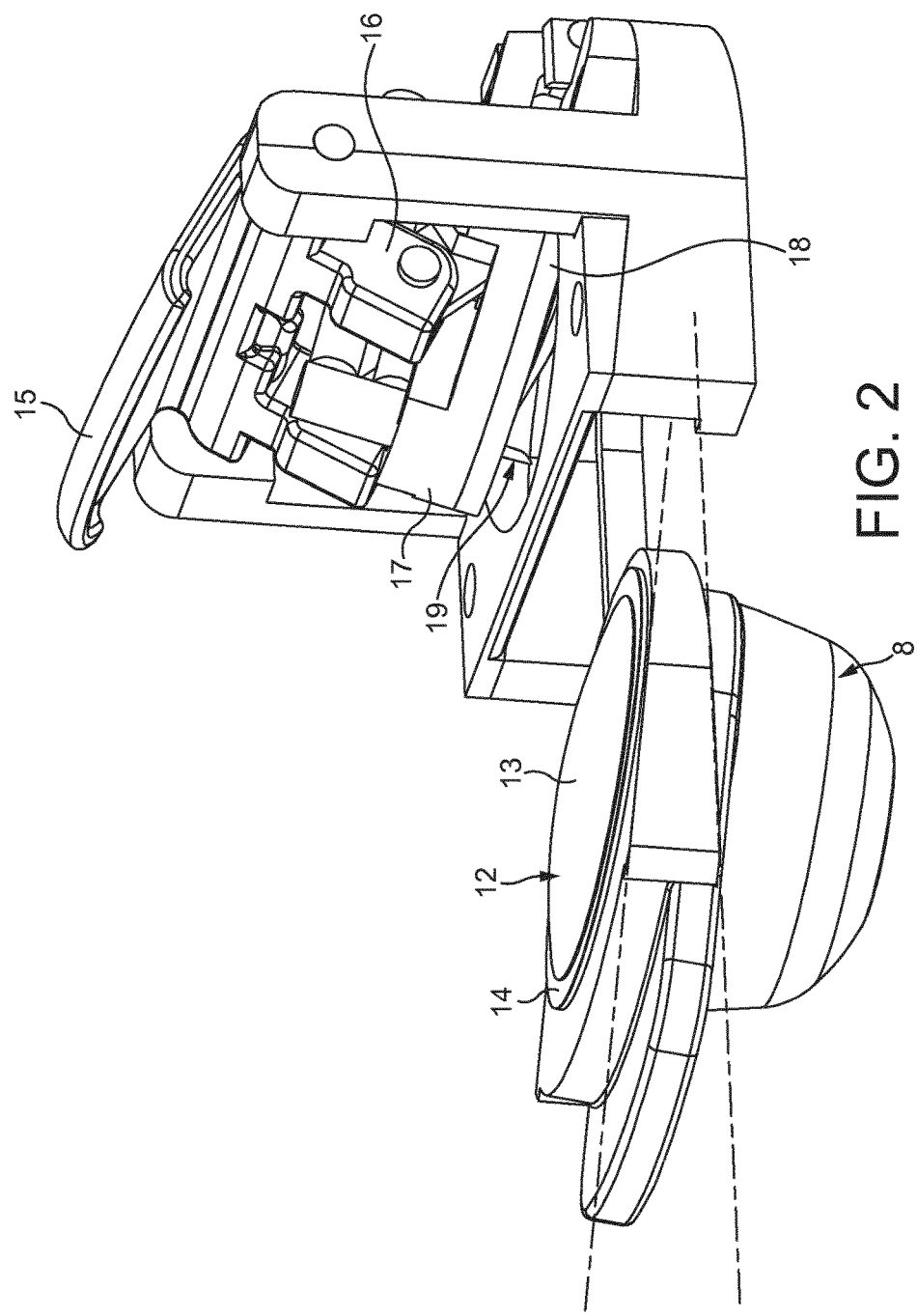
FIG. 2 is a schematic enlarged perspective view showing the interior of the brewing head of a machine as illustrated in FIG. 1.

FIG. 2 represents schematically the internal configuration of an embodiment of a brewing head 3 in its open position. The capsule holder 8 is loaded with a capsule 12. The capsule has a top pierceable membrane 13, and top peripheral edge 14. The brewing head 3 typically comprises an open/close mechanism with a handle 15 and a knee mechanism 16 that mechanically links the handle to a support plate 17. The support plate 17 carries an injection plate 18 that is moved in direct contact with the peripheral edges 14 and top membrane 13 of the capsule in a leaktight manner, when the brewing head is in the closed position. The injection plate is a needle plate 18 that carries one injection needle 19 to pierce through the top membrane of the capsule when the brewing head is closed. The needle 19 is linked in a fluidic manner (via pipes) to the pump, heating element, and reservoir (elements not shown in the drawing) of the machine.

The needle plate 18 comprises several cleaning channels 21. These channels 21 are through holes which connect the lower surface 22 of the needle plate to its upper surface 23. These channels are completely independent from the fluid conveying channel that conveys water from the fluid system of the machine to the needle. Channel does not communicate with the upper portion 23 of the needle plate. The fluid conducting channel is unable to conduct fluid (e.g. water) directly to the upper surface 23 of the needle plate. The diameter of the cleaning channels 21 is comprised between 0.4 and 7.0 mm, and more precisely, the diameter is about 1.5 mm.

Figure 3:
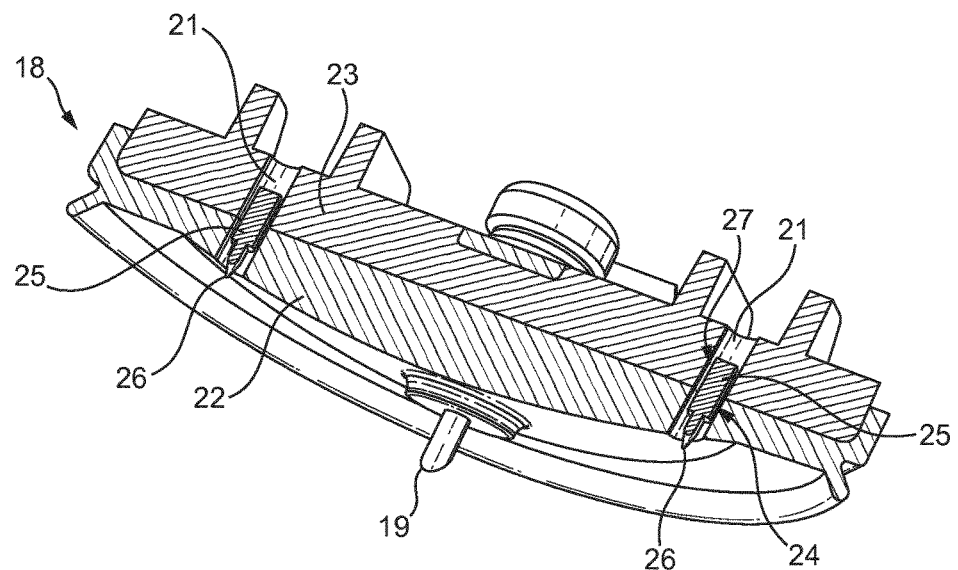
FIG. 3 is a schematic perspective view of a needle plate with channels and piercing elements according to the invention.
Figure 4:
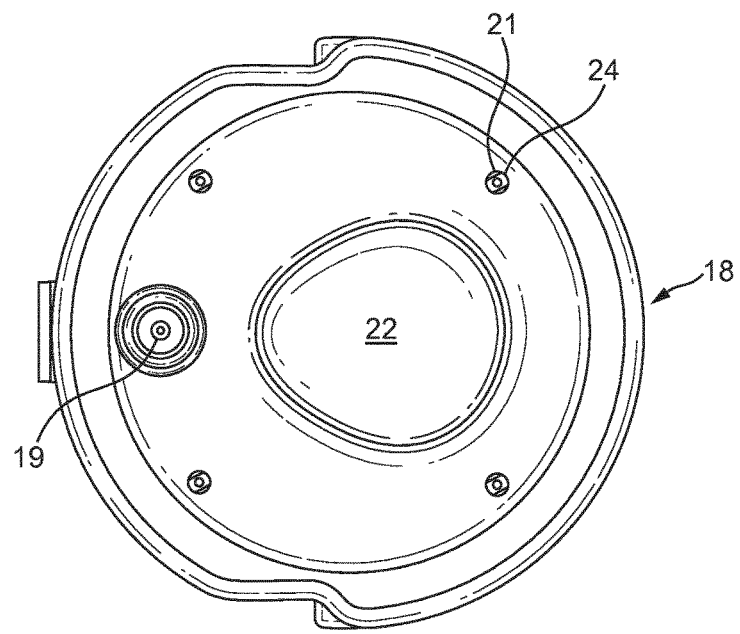
FIGS. 4 and 5 are schematic bottom, respectively side, views of a needle plate similar to that of FIG. 3.
Figure 5:
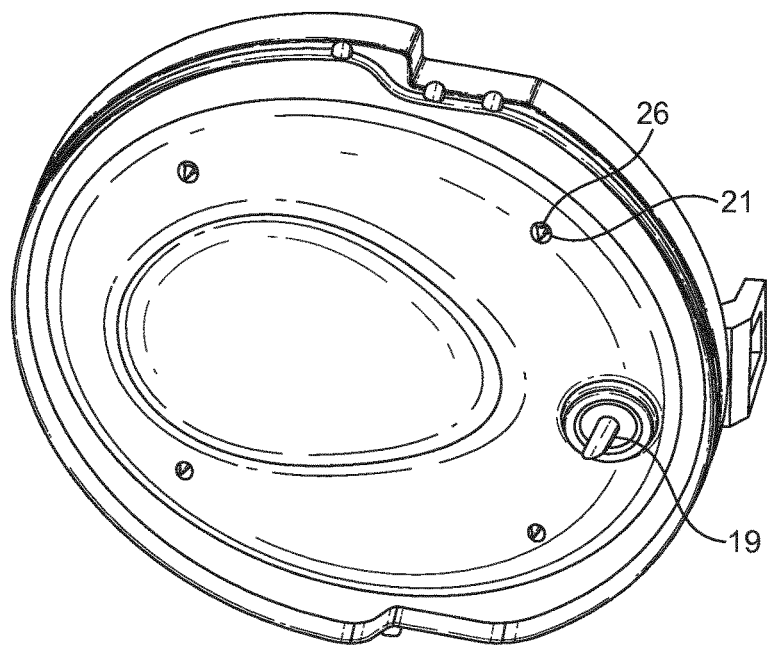

As illustrated in FIGS. 3, 4 and 5, the needle plate 18 further comprises a plurality of piercing elements 24, each being located in a corresponding cleaning channel 21. Each piercing element 24 has a base 25 attached to said injection plate and an apex 26 directed towards the lower surface 22 of said injection plate, which therefore comes into contact with the top membrane (top wall) of the capsule in certain conditions as will be explained in further detail herebelow.

Figure 6:
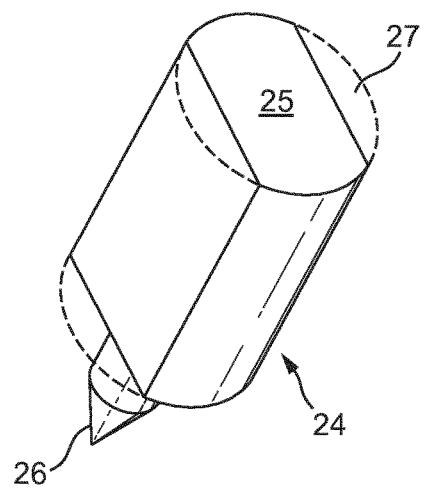
FIG. 6 is a schematic perspective top view of a piercing element according to the invention.

Each piercing element's apex 26 is located inside a corresponding cleaning channel 21. As shown in FIG. 6, each base 25 of a piercing element 24 has a cross section which is substantially ovoid, and has a dimension inferior to the corresponding cross section of the channel 21 into which it is assembled, along at least one radial direction. Since the cleaning channels are cylindrical, as shown in dotted lines in FIG. 6, this provides a pair of side channels 27 between said piercing element 24 and the internal surface of the corresponding cleaning channel 21.

During normal operation, the pressure builds-up within the capsule, and the latter opens at its dispensing—bottom—side to let the beverage flow out into a cup placed below, as explained here above.

In case of a capsule blockage, when fluid pressure builds-up within the capsule, its top membrane will flex upwards and its shape will tightly conform to the lower surface 22 of the needle plate, optionally entering into the channels 21 as well. It will then contact the apex 26 of each piercing element 24, which will pierce said top membrane to release the pressure and unblock the capsule. The pressurized fluid advantageously flows through the side channels 27 towards the upper surface of the needle plate 18, which can then be dismounted from the machine to be cleaned. By unblocking the capsule, the machine security—if one is present—is disconnected, which allows the user to unlock the brewing head of said machine.

It was found that placing the apex 26 of the piercing elements 24 at about the same position as the lower surface 22 of the needle plate, allows to guarantee that the top membrane of the capsule will flex upwards and be pierced—in case of capsule blockage—when the fluid pressure inside the capsule is slightly above the maximum normal opening pressure of said capsule, i.e. at a pressure inside the capsule that is comprised between 15 and 20 bar.

The invention claimed is:

1. A beverage preparation machine for preparing a beverage from a food substance contained in a capsule by injection of a fluid into the capsule, the beverage preparation machine comprising:
   a capsule holder for holding the capsule;
   a fluid conduction system comprising a fluid reservoir, a fluid pump, and a heater, wherein the fluid reservoir, the fluid pump, and the heater are connected by fluid pipes;
   a brewing head having an aperture for receiving the capsule holder;
   an injection support connected to the fluid conduction system;
   an injection plate supported by the injection support, the injection plate comprising an upper surface connected to the fluid conduction system through the injection support, the injection plate further comprising a lower surface and a fluid injection element located in the lower surface such that the fluid injection element is able to inject fluid into the capsule by piercing through a flexible injection wall of the capsule, the injection plate comprises at least one fluid conducting passage configured to conduct the fluid from the fluid conduction system to the fluid injection element, the injection plate further comprises at least one channel independent from the fluid conducting passage and connecting the upper surface and the lower surface of the injection plate, the at least one channel configured to circulate the fluid at least from the lower surface towards the upper surface of the injection plate, the at least one channel comprising at least one piercing element having a base attached to the injection plate and an apex directed towards the lower surface of the injection plate, the apex being located inside the at least one channel or protruding outside of the at least one channel at a distance from the lower surface of the injection plate of between 1 pm and 2 mm, wherein the at least one channel comprises a cleaning channel in which the at least one piercing element is positioned, a side channel is formed between an internal surface of the cleaning channel and the corresponding piercing element, the side channel extending from a lower opening of the cleaning channel and an upper opening of the cleaning channel, the side channel configured to conduct the fluid at least from the lower surface to the upper surface of the injection plate.

2. The beverage preparation machine according to claim 1, wherein the apex is conical.

3. The beverage preparation machine according to claim 1, wherein the at least one piercing element is hollow.

4. The beverage preparation machine according to claim 1, wherein the at least one piercing element is plain.

5. The beverage preparation machine according to claim 1, wherein the base of the at least one piercing element is attached to the internal surface of the at least one channel, the base having a cross section that is less than a corresponding cross section of the at least one channel along at least one radial direction.

6. The beverage preparation machine according to claim 1, wherein the injection plate is made of a metallic or alloy solid material, coated with an elastic material on the lower surface.

7. The beverage preparation machine according to claim 1, wherein the at least one piercing element is made of a rigid metallic material.

8. The beverage preparation machine of claim 1, wherein the at least one channel is a through hole.

9. The beverage preparation machine of claim 1, wherein the at least one fluid conducting passage does not fluidically communicate with an upper portion of the injection plate.

10. The beverage preparation machine of claim 1, wherein the at least one fluid conducting passage forms a fluid conducting channel.

11. The beverage preparation machine of claim 1, wherein a portion of the lower surface of the injection plate is positioned between (1) a first intersection of the lower surface and the at least one channel and (2) a second intersection of the lower surface and the fluid conducting passage.

12. The beverage preparation machine of claim 1, wherein one or more of the at least one channel is positioned at an opposite end of the lower surface of the injection plate from the injection element.

13. The beverage preparation machine of claim 1, wherein the apex is located inside the at least one channel.

14. The beverage preparation machine of claim 1, wherein each piercing element is configured to pierce the flexible injection wall and direct the fluid through the side channel to the upper surface of the injection plate upon the flexible injection wall of the capsule flexing upward from accumulation of fluid pressure within the capsule.

15. The beverage preparation machine of claim 14, wherein the at least one channel is configured to receive the flexible injection wall of the capsule upon the flexible injection wall of the capsule flexing upward from accumulation of fluid pressure within the capsule.

16. A beverage preparation machine for preparing a beverage from a food substance contained in a capsule by injection of a fluid into the capsule, the beverage preparation machine comprising:

a capsule holder for holding the capsule;

a fluid conduction system comprising i) a fluid reservoir, a fluid pump, and a heater, wherein the fluid reservoir, the fluid pump, and the heater are connected by fluid pipes, ii) a brewing head having an aperture for receiving the capsule holder, and iii) an injection support connected to the fluid conduction system;

an injection plate supported by the injection support, the injection plate comprising a first area connected to the fluid conduction system through the injection support, the injection plate further comprising a second area and a fluid injection element located in the second area, such that the fluid injection element is configured able to inject fluid into the capsule by piercing through a flexible injection wall of the capsule, the fluid injection element arranged relative to the capsule holder to pierce through the flexible injection wall of the capsule when the brewing head is in a closed position, the injection plate further comprising at least one fluid conducting passage configured to conduct the fluid from the fluid conduction system to the fluid injection element, at least one channel independent from the at least one fluid conducting passage and connecting the first area and the second area of the injection plate, the at least one channel configured to circulate the fluid at least from the second area towards the first area of the injection plate, the at least one channel comprising at least one piercing element having a base attached to the injection plate and an apex directed towards the second area of the injection plate, the at least one piercing member arranged relative to the capsule holder such that the apex does not contact the flexible injection wall of the capsule when the brewing head reaches the closed position, and the apex pierces the flexible injection wall of the capsule when the flexible injection wall of the capsule is flexed outwards from a predetermined amplitude, wherein the at least one channel comprises a cleaning channel in which the at least one piercing member is positioned, a side channel is formed between an internal surface of the cleaning channel and the corresponding piercing member, the side channel extending from a lower opening of the cleaning channel and an upper opening of the cleaning channel, the side channel configured to conduct the fluid at least from the second area to the first area of the injection plate.

17. The beverage preparation machine of claim 16, wherein each piercing element is configured to pierce the flexible injection wall and direct the fluid from the second area through the side channel to the first area of the injection plate upon the flexible injection wall of the capsule flexing upward from accumulation of fluid pressure within the capsule.

18. The beverage preparation machine of claim 17, wherein the at least one channel is configured to receive the flexible injection wall of the capsule upon the flexible injection wall of the capsule flexing upward from accumulation of fluid pressure within the capsule.

* * * * *